US012462229B1

United States Patent
Kapur et al.

(10) Patent No.: US 12,462,229 B1
(45) Date of Patent: Nov. 4, 2025

(54) PREFERENTIAL ROUTING OF VIRTUAL RESOURCE TRANSFERS

(71) Applicant: Citibank, N.A., New York, NY (US)

(72) Inventors: Shikhar Kapur, Brooklyn, NY (US); Sastry Appajosyula, New York, NY (US); Carey O. Kolaja, Montclair, NJ (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 19/184,927

(22) Filed: Apr. 21, 2025

Related U.S. Application Data

(63) Continuation-in-part of application No. 15/279,195, filed on Sep. 28, 2016.

(51) Int. Cl.
*G06Q 20/02* (2012.01)
*G06N 20/00* (2019.01)
*G06Q 20/08* (2012.01)
*H04L 45/30* (2022.01)

(52) U.S. Cl.
CPC ......... *G06Q 20/027* (2013.01); *G06N 20/00* (2019.01); *G06Q 20/08* (2013.01); *G06Q 20/0855* (2013.01); *H04L 45/30* (2013.01)

(58) Field of Classification Search
CPC .. G06Q 20/027; G06Q 20/08; G06Q 20/0855; G06N 20/00; H04L 45/30
See application file for complete search history.

(56) References Cited

U.S. PATENT DOCUMENTS

| | | | |
|---|---|---|---|
| 2018/0315051 A1* | 11/2018 | Hurley | G06Q 20/326 |
| 2022/0327504 A1* | 10/2022 | Koren | G06F 11/3476 |
| 2024/0152880 A1* | 5/2024 | Wang | G06Q 20/405 |

* cited by examiner

*Primary Examiner* — Shirley X Zhang
(74) *Attorney, Agent, or Firm* — Perkins Coie LLP

(57) ABSTRACT

Methods and descriptions are described herein for determining preferred routes for transferring virtual resources between nodes across networks. In particular, a source node may be attempting to transfer resources to a destination node, where both nodes belong to a first network. The system determines an association between the destination node and a second network of nodes, wherein the second network includes proxy nodes associated with the first network. The system uses a machine learning model to identify a route along one or more of the proxy nodes for transfer of the resources from the source node to the destination node along the route. The system conducts the transfer of the resources by crediting the destination node and debiting the source node before conducting any intermediate transfers on the route. The system then conducts intermediate transfers between the proxy nodes along the route.

20 Claims, 10 Drawing Sheets

PREFERENTIAL ROUTING OF VIRTUAL RESOURCE TRANSFERS

SUMMARY

Routing virtual resources across nodes spanning multiple networks presents significant technological challenges. Such a system requires addressing the complexity of multiple network topologies and the variability in resource requirements along each potential route. These complexities may make it difficult to determine the most efficient and secure route for transferring virtual resources. Moreover, conventional approaches may rely on static routing protocols for transferring virtual resources, which do not capture the dynamic nature of network conditions and resource requirements. For example, a conventional system may apply a fixed route for all transfers, which may be suboptimal for certain transfer scenarios. This approach may result in inefficient resource utilization and increased transfer times.

Furthermore, conventional methods of transferring resources may be limited due to their reliance on sequential transfers along an identified path. This process involves transferring resources from one node to the next in the order of the path, which can introduce delays at each intermediate step. As each transfer must be completed before the next one begins, the overall time required to move resources from the source to the destination may be significant. This sequential approach may also increase the risk of bottlenecks and inefficiencies, as any delay or issue at an intermediate node can impact the entire transfer process. Additionally, the resources may be more vulnerable to attacks during intermediary transfers, as each step in the sequence presents a potential point of exposure to malicious activities. The risk of other problems, such as technical failures, human errors, or miscommunications, may also be exacerbated during these intermediary transfers, further complicating and delaying the process.

The disclosed solution addresses these challenges, for example, by utilizing machine learning to identify a preferred route for transferring virtual resources from a source node to a destination node. The preferred route may include proxy nodes in a third-party network, where the proxy nodes are associated with the local network. For example, the proxy nodes may have greater efficiency, lower resource requirements, or other benefits over local nodes. The machine learning model may take into account predefined criteria for the route, such as resource requirements, speed, and constraints of potential routes. By dynamically analyzing and weighing these factors, the model may determine the preferred path for transferring virtual resources. This adaptive approach may ensure that the routing process is responsive to real-time changes in network conditions, thereby optimizing resource utilization and reducing transfer times. Additionally, the disclosed solution may enable resources to be transferred directly from a source node to a destination node, bypassing intermediate transfers along the route until after the destination node receives the resources. This direct transfer approach may expedite the receipt of resources by the destination node before the system navigates the intermediate transfers and any associated slowdowns. This method may enhance the reliability and security of the resource transfer process, as it reduces the number of steps and potential points of failure before the destination node receives the resources.

In particular, the system receives destination information related to a destination node for the transfer of virtual resources from a source node, both of which belong to a first network (e.g., a local network) involving first nodes. Based on this destination information, the system determines an association between the destination node and a second network that includes a set of proxy nodes associated with the first network. The system then inputs a source identifier, a destination identifier, and a set of proxy node identifiers into the machine learning model to output a preferred route for the transfer, considering predefined criteria such as resource requirements, speed, and regulatory constraints. The transfer process is initiated by transmitting commands to credit the destination node and debit the source node before conducting any intermediate transfers along the route. Subsequently, commands are transmitted to conduct the intermediate transfers between the proxy nodes along the determined route.

In some embodiments, the system may receive destination information relating to a destination node for transfer of virtual resources from a source node to the destination node. The source node and the destination node may belong to a first network, including a first plurality of nodes. This destination information may include specific details about the target node's location, network address, and any relevant credentials required for the transfer. The first network, including multiple interconnected nodes, may facilitate the initial and final stages of the resource transfer. By accurately identifying the destination node within this network, the system may ensure that the virtual resources are directed to the endpoint without delay or security risk, thereby maintaining the reliability and efficiency of the transfer process.

The system may determine, based on the destination information, an association between the destination node and a second network, including a second plurality of nodes. The second plurality of nodes may include a set of proxy nodes associated with the first network. The proxy nodes may be associated with the first network via a database. This association may indicate that the proxy nodes within the second network are recognized and trusted by the first network, allowing them to facilitate the transfer of virtual resources. The association may be identified through various network mapping techniques and data analysis, which help in understanding the interconnections between the first and second networks. The proxy nodes within the second network may act as the intermediaries that facilitate the transfer of virtual resources between the source and destination nodes.

The system may input, into a machine learning model, a source identifier of the source node, a destination identifier of the destination node, and a set of identifiers of the set of proxy nodes. This may cause the machine learning model to output a route including one or more proxy nodes for transfer of the virtual resources from the source node to the destination node along the route. The proxy nodes may be selected for the route based on their connectivity, reliability, and efficiency to ensure a seamless transfer process. In particular, the route may be based at least in part on predefined criteria, such as a resource requirement, speed, or regulatory constraint associated with each potential node along each potential route.

The system may then initiate the transfer of the virtual resources. The system may transmit a first command to credit the destination node and a second command to debit the source node before transmitting any commands for intermediate transfers along the route. After transmitting the first command and the second command, the system may transmit commands to conduct the intermediate transfers between the proxy nodes along the route. This approach may ensure that the destination node receives the resources and that the source node's resources are appropriately debited before any further actions are taken. By prioritizing these commands, the system establishes a clear and secure framework for the direct transfer before handling the intermediate transfers. This method may expedite the direct transfer process, as the critical steps of crediting and debiting are handled upfront, allowing subsequent intermediate transfers to be dealt with separately.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION

Figure 1:
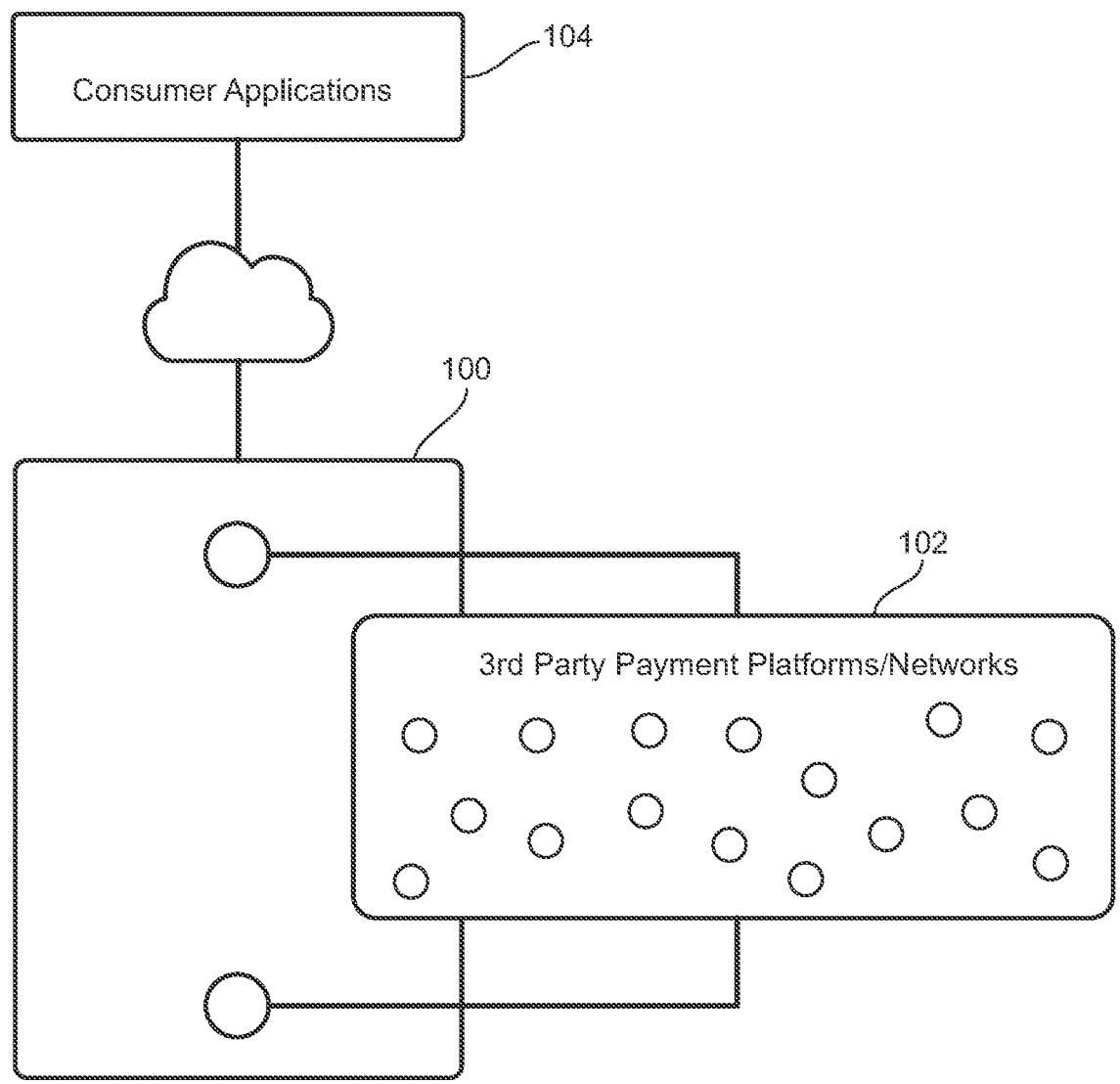
FIG. 1 is a schematic diagram that illustrates examples of deployment and integration of components of a system for embodiments of the invention.

Systems and methods disclosed herein utilize machine learning to identify a preferred route for transferring virtual resources from a source node to a destination node. The preferred route may include proxy nodes in a third-party network, where the proxy nodes are associated with the local network. By dynamically analyzing and weighing various criteria, the model may determine the preferred path for transferring virtual resources between the proxy nodes along the route. This adaptive approach may ensure that the routing process is responsive to real-time changes in network conditions. Additionally, the disclosed solution may enable resources to be transferred directly from a source node to a destination node, bypassing intermediate transfers along the route until after the destination node receives the resources. This method may enhance the reliability and security of the resource transfer process, as it reduces the number of steps and potential points of failure before the destination node receives the resources.

As an illustrative example, virtual resources may include cloud computing resources. In a cloud computing environment, the transfer of cloud computing resources from a central data center (source node) to a regional office (destination node) may involve the use of intermediate nodes that are part of a third-party network. These intermediate nodes, such as regional data centers or edge servers, may be proxy nodes associated with the company but managed by third-party network providers rather than the company itself. The disclosed system may determine a preferred route between the source and destination along these proxy nodes according to various criteria and other considerations. However, this sequential transfer path may lead to delays due to the multiple hops and potential congestion at each intermediate node. In contrast, the disclosed system credits the destination node before the actual transfer through the third-party network occurs. This may be achieved using advanced cloud management technologies that allow for the pre-allocation of resources. The central data center may first send a command to credit the regional office with the required cloud computing resources. Simultaneously, a command is sent to debit the central data center's resource pool, ensuring that the allocation is properly accounted for. This crediting and debiting may reduce latency, ensuring that the resources are available at the destination more quickly. By crediting the destination node first, the regional office can immediately begin preparing for the deployment of the new resources, even before the actual transfer is completed. This can significantly reduce the time required to get the resources up and running. Once the crediting and debiting are completed, the actual transfer of resources can occur. The resources may be routed from the central data center to the regional office along the intermediate nodes in the third-party network.

In particular, the system may receive destination information relating to a destination node for transfer of virtual resources from a source node to the destination node. This destination information may include specific details about the target node's location, network address, and any relevant credentials required for the transfer. Additionally, the source information may comprise a user classification of a user or a broader classification of an organization associated with the source node. For example, a user classification may be a tiered classification based on seniority, loyalty, engagement, or other criteria. In some embodiments, a classification of an organization may refer to a type of organization or a ranking of the organization. As an illustrative example, when transferring cloud computing resources from a central data center to a regional office, the system may gather detailed information about the regional office's network address and necessary credentials, as well as classify the user associated with the data center to ensure proper authorization and resource allocation. This detailed information allows for a more efficient and secure transfer process, minimizing delays and ensuring that resources are allocated correctly and promptly.

The source node and the destination node may belong to a first network, including a first plurality of nodes. The first network, including multiple interconnected nodes, may facilitate the initial and final stages of the resource transfer.

By identifying the destination node within the network, the system may ensure that the virtual resources are directed to the endpoint with minimal delay or security risk. For example, when transferring cloud computing resources from the central data center to a regional office, the system may utilize the interconnected nodes within the company's network to manage the initial allocation and final delivery of resources. The first network may be connected to another network, a third-party network, which may include various data centers and edge servers that work with the first network to streamline the transfer process.

The system may determine, based on the destination information, an association between the destination node and a second network, including a second plurality of nodes. The second plurality of nodes may include a set of proxy nodes associated with the first network. This association may indicate that the proxy nodes within the second network are recognized and trusted by the first network, allowing them to facilitate the transfer of virtual resources. The association may be identified through various network mapping techniques and data analysis, which help in understanding the interconnections between the first and second networks. The proxy nodes within the second network may act as the intermediaries that facilitate the transfer of virtual resources between the source and destination nodes. For example, the system may identify that the regional office is associated with a second network managed by a third-party provider. This second network may include proxy nodes in nearby cities, which are recognized and trusted by the first network. By leveraging these proxy nodes, the system can ensure a seamless and secure transfer of resources, utilizing the trusted interconnections between the first and second networks.

The system may utilize a machine learning model to identify a route between the source and destination nodes along various proxy nodes in the second network. In some embodiments, the machine learning model may be trained to identify routes spanning multiple networks to connect source and destination nodes. The machine learning model may further be trained to account for various criteria, such as resource requirements, speeds, or regulatory constraints associated with different nodes and different routes. For example, the machine learning model may be trained to analyze multiple potential routes through proxy nodes in the second network, such as those routing through nearby cities. The model may evaluate each route based on factors like the bandwidth availability, latency, and compliance with regional data regulations. By doing so, the system can determine a preferred path for transferring virtual resources.

The system may input, into the trained machine learning model, a source identifier of the source node, a destination identifier of the destination node, and a set of identifiers of the set of proxy nodes. For example, the system may input an identifier of the central data center as the source node, the identifier of the regional office as the destination node, and a set of identifiers for the proxy nodes, such as regional data centers in nearby cities or edge servers. This may cause the machine learning model to output a route including one or more proxy nodes for transfer of the virtual resources from the source node to the destination node along the route. For example, the machine learning model may identify a route for transferring the virtual resources from a central data center in New York to the proxy node in Denver, and then from Denver to a regional office in San Francisco.

In some embodiments, the route is based at least in part on predefined criteria, such as a resource requirement, speed, or regulatory constraint associated with each potential node along each potential route. In some embodiments, the route is based at least in part on a node penalty or node feature of each proxy node. For example, a node penalty of a particular node may be a detriment to the route based on choosing that node. The node penalty may include a cost, latency, risk, or other detriment associated with that node. For example, if a proxy node in Chicago has higher operational costs or introduces significant latency, the machine learning model may assign a higher penalty to that node. Conversely, if a proxy node in Denver offers lower costs and faster transfer speeds, it may have a lower penalty, making it a more favorable choice for the route. In some embodiments, lower costs and faster transfer speeds may be features of a proxy node. By considering these node penalties, features, or other predefined criteria, the system can optimize the route along the proxy nodes.

In some embodiments, the system may enforce the predefined criteria by eliminating certain proxy nodes from consideration before inputting the set of proxy nodes into the machine learning model for route identification. In particular, the system may eliminate certain proxy nodes from the set of proxy nodes based on the predefined criteria. In some embodiments, the system may eliminate proxy nodes in such a way that the machine learning model is unable to identify a route among the remaining proxy nodes. Based on the machine learning model failing to generate a route between the source node and the destination node along the proxy nodes that have not been eliminated, the system may relax certain criteria to make a route possible. For example, the system may modify a criterion that has the lowest priority among the predefined criteria. The system may generate a subset of proxy nodes by eliminating proxy nodes from the set of proxy nodes based on the predefined criteria after modifying or relaxing the criterion having the lowest priority. The system may then input, into the machine learning model, the subset of proxy nodes to cause the machine learning model to select the route between the source node and the destination node from among the subset of proxy nodes that have not been eliminated.

In some embodiments, modifications to criteria may vary for different types of criteria. For example, the system may determine that speed has a lower priority than cost and regulatory constraints. Accordingly, the system may relax the speed requirements for potential proxy nodes. Speed may be a continuous variable, and as such, the system may modify this criterion by lowering a minimum speed threshold for potential proxy nodes by a certain amount. In some embodiments, the system may lower the minimum speed threshold for potential proxy nodes by a small amount initially and may later lower the threshold by a greater amount if the system still fails to identify a route. In some embodiments, the system may determine that regulatory constraint has a lower priority than cost and speed. Accordingly, the system may relax the regulatory constraints for potential proxy nodes. In some embodiments, regulatory constraints are a categorical variable, and as such, the system may modify this criterion by changing a category of the constraint (e.g., high to low, category 3 to category 2, etc.).

For example, the system may initially eliminate nodes according to certain predefined criteria, causing the machine learning model to fail to identify a route between the central data center in New York to the regional office in San Francisco. Accordingly, the system may relax certain criteria, such as the lowest priority criteria. If the system determines that the lowest priority criteria is cost, the system may modify a cost threshold applied to potential proxy nodes to allow certain proxy nodes that are more costly to include in the route. The system may then perform an updated elimination of proxy nodes based on the updated criteria and input, into the machine learning model, the remaining proxy nodes that have not been eliminated. The machine learning model may then identify a route based on the updated criteria between the central data center in New York to the regional office in San Francisco. For example, a proxy node in Boise that may have initially been eliminated based on high cost may be included based on the updated criteria. Accordingly, the machine learning model may identify a route from the central data center in New York to the proxy node in Boise, and then from Boise to the regional office in San Francisco.

In some embodiments, the route is further based at least in part on source information relating to the source node. The source information may include a user classification of a user associated with the source node. For example, the user classification may be one of several tiered classifications indicating a status, ranking, or other information about the user. For example, the classifications may include first and second classifications, where the first classification is a higher classification than the second classification. Based on the user classification being a first classification, the system may modify the priorities of the predefined criteria to cause the machine learning model to prioritize speed over resource requirements when selecting the route. For example, for a high-ranking customer, the system may increase the priority of the speed and allow for higher costs of the route. Based on the user classification being a second classification, the system may modify the priorities of the predefined criteria to cause the machine learning model to prioritize the resource requirement over the speed for selecting the route. For example, for a lower-ranking customer, the system may increase a priority of cost efficiency and allow for greater latency of the route.

In some embodiments, the route is further based at least in part on source information relating to the source node and destination information relating to the destination node. For example, the source information may include source location information relating to the source node, and the destination information may include destination location information relating to the destination node. This location information may encompass various geographical details such as state, region, country, or other details. By incorporating this information, the system can better understand the geographical context and constraints associated with the transfer. For instance, the system may consider the physical distance between nodes, regional network performance, and any geopolitical factors that may impact the transfer. Additionally, the system may take into account the specific characteristics of the source and destination nodes, such as their capacity, security protocols, and operational status. By integrating this comprehensive set of information, the system can optimize the route to ensure a reliable and efficient transfer of resources.

For example, in the cloud computing example, if the system is transferring virtual resources from the central data center in New York to the regional office in San Francisco, it may use the source location information of New York and the destination location information of San Francisco to determine the most efficient route. The system may consider the geographical distance between these two cities, the network performance in different regions, and any relevant regulatory constraints. By analyzing this information, the system may identify that routing through a proxy node in Denver offers a balance of speed, cost, and compliance with data regulations.

In some embodiments, different locations may be associated with different levels of risk. For example, there may be at least a first and second level of risk, where the second level of risk is higher than the first level of risk. Based on the source location information and the destination location information both indicating locations associated with a first level of risk, the system may generate a subset of proxy nodes by eliminating proxy nodes associated with locations associated with a second level of risk from the set of proxy nodes. The system may then input, into the machine learning model, the subset of proxy nodes to cause the machine learning model to select the route between the source node and the destination node from among the subset of proxy nodes that have not been eliminated.

In the illustrative example, if the system is transferring virtual resources from a central data center in New York to a regional office in San Francisco, it may first assess the risk levels associated with these locations. If both New York and San Francisco are determined to be associated with a first level of risk, the system may then eliminate any proxy nodes located in regions with a second level of risk, such as areas prone to frequent cyber-attacks. By doing so, the system generates a subset of proxy nodes that are considered less risky. The machine learning model may then use this subset to determine the preferred route. For example, the machine learning model may select a route that includes a proxy node in Denver, which is associated with a first level of risk, ensuring that the virtual resources are transferred securely and efficiently from New York to San Francisco.

In some embodiments, the system may determine regulatory restraints associated with the source and destination locations. For example, the system may determine a first regulatory constraint based on the source location information and a second regulatory constraint based on the destination location information. The system may modify the priorities of the predefined criteria to cause the machine learning model to prioritize the first regulatory constraint and the second regulatory constraint over the resource requirement and the speed for selecting the route. For example, New York may have stringent data privacy laws that require data to be encrypted during transfer, and San Francisco may have regulations that mandate data must not pass through certain jurisdictions. The system may then adjust the priorities of the predefined criteria to ensure that these regulatory constraints are given higher importance than other factors, such as resource requirements and speed. As a result, the machine learning model may select a route that includes proxy nodes in regions that comply with both New York's and San Francisco's regulatory requirements, such as a proxy node in Denver. This ensures that the virtual resources are transferred in a manner that adheres to all relevant regulations.

Once the route is identified, the system may then initiate the transfer of the virtual resources. The system may transmit a first command to credit the destination node and a second command to debit the source node before transmitting any commands for intermediate transfers along the route. For example, in the cloud computing example, if the system has identified a route from the central data center in New York to the regional office in San Francisco via a proxy node in Denver, it may first send a command to the regional office in San Francisco to credit its account with the virtual resources. Simultaneously, the system may send a command to the central data center in New York to debit its account, indicating that the resources are being transferred. By prioritizing these commands, the system establishes a clear and secure direct transfer before handling the intermediate transfers. This method may expedite the direct transfer process, as the critical steps of crediting and debiting are handled upfront, allowing subsequent intermediate transfers to be dealt with subsequently.

After transmitting the first command and the second command, the system may transmit commands to conduct the intermediate transfers between the proxy nodes along the route. For example, once the system has sent the initial commands to credit the regional office in San Francisco and debit the central data center in New York, it may then proceed to transmit commands for the intermediate transfer through the proxy node in Denver. The system may send a command to the proxy node in Denver to prepare for receiving the virtual resources from New York and another command to forward these resources to the San Francisco node. The system may command the New York node to initiate the transfer to the Denver node. This approach may ensure that the destination node receives the resources and that the source node's resources are appropriately debited before any further actions are taken.

Other Embodiments

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used in another embodiment to yield a still further embodiment. Thus, it is intended that the present invention cover such modifications and variations that come within the scope of the invention.

Embodiments of the invention provide funds transfer systems and methods that include, for example, a decision support system, knowledge-based systems, machine learning, and multivariate optimization of money movement based, for example, on a combination of configurable business rules, closed-loop learning and continuous improvement. Such embodiments provide a comprehensive solution for reliable, consistent, and cost-effective money movement by dynamically building and utilizing optimized payment networks using, for example, proxy accounts with third party payment networks/platforms.

Thus, systems and methods for embodiments of the invention enable business innovation at speed and scale by providing a consistent facade to payment platforms and networks and optimizing every transfer based, for example, on a variety of criteria, such as the cost of transfer, country risk, regulatory costs, business rules, and partner agreements. Such embodiments also manage all metadata and historical data related to transfers, some directly and the remainder, for example, by calling the appropriate system and include a built-in analytics engine to analyze such data and to provide decision support for selecting an appropriate payment path. In addition, historical data may be made available for analysis and learning. The facade to payment platforms and networks provided by embodiments of the invention may enable a business to reach new markets by making it possible for third party developers to utilize the functionality of the proposed invention in their own businesses.

Aspects of system and methods for embodiments of the invention may include, for example, registration and classification of payment networks and platforms; definitions of optimization criteria, such as business rules, transaction costs, partner agreements; and run-time acquisition of key data, such as country risk, transfer speed, and payment network status. Other aspects of such embodiments may include, for example, determining a best payment path for applicable constraints and execution and instrumentation of payments. Still other aspects may include, for example, monitoring the extended network and acting as an advance warning system, and acquisition and analysis of data using various machine learning techniques for automatic decision support.

Embodiments of the invention may provide money movement, for example, to an arbitrary number of applications. In such embodiments, the payment process may be orchestrated based on various criteria, some of which may be automatically determined by the system and others of which may be explicitly provided to the system by administrators. In embodiments of the invention, all data related to payment path definition and execution, including audit trail, may be maintained in an operations database. Further, embodiments of the invention may scale out to support any number of payment networks, payments, and running instances and to support multiple levels of access and publication (e.g., making public). However, published data may be subject to access control, and unless published, only a creator may have access to payment networks and execution of related constraints and rules.

In an aspect of embodiments of the invention, users may be proactively notified by the system. In addition, the system for embodiments of the invention may monitor all registered payment networks and platforms. Should a particular payment network or platform become unresponsive, appropriate notifications may be sent immediately, so that remedial measures may be taken without delay. A decision support module for embodiments of the invention may be one of the recipients of such notifications.

In embodiments of the invention, a separate analytics database may capture instrumentation data as well as any data designated for analytics and machine learning. Various machine learning algorithms may be run on such data that may enable the system for embodiments of the invention to extract knowledge that may then be used to provide decision support. In embodiments of the invention, execution of such machine learning algorithms may be automatic. Further, in order to ease burdens of troubleshooting and root cause analysis, logs may be managed centrally in embodiments of the invention, no matter which participating platform or network may have generated the message being logged.

FIG. 1 is a schematic diagram that illustrates examples of deployment and integration of components of a system for embodiments of the invention. Embodiments of the invention provide a network-agnostic money movement system in which a financial institution, such as a global bank, may integrate a funds transfer server 100 having one or more processors with third party payment networks and platforms 102, for example, through open application program interfaces (APIs). Third party payment networks and platforms 102 with which embodiments of the invention maintain proxy accounts may be characterized herein as provider applications. Such third party payment networks and platforms 102 may include, for example, banking consortium networks, government sponsored person-to-person (P2P) country networks, and non-bank networks, such as social media networks. It is to be understood that while the financial institution may maintain proxy accounts in one or more of such third party payment networks and platforms 102, the financial institution has no ownership interest in any of the third party payment networks and platforms 102.

Applications that users may install and use on their devices as components of embodiments of the invention may be characterized herein as consumer applications 104 and may be utilized with the application program interface (API) layer of embodiments of the invention. Embodiments of the invention may enable movement of money through such third party networks and platforms 102 through proxy accounts owned, for example, on the third party networks and platforms. Thus, embodiments of the invention may be characterized as providing an overlaid virtual network with the financial institution controlling logic for the virtual network.

From a financial institution customer's perspective, according to embodiments of the invention, the customer may make payments to anyone regardless of which one of the third party networks 102 on which the recipient may be found without regard to where the recipient is located or whether or not the recipient is a financial institution customer. Further, in embodiments of the invention, recipients may be designated using only identifiers, such as phone numbers, email addresses, or a social "handle" of the recipient, and customers may be shielded from all involvement or exposure to details of the back-end processing of transactions. A payment may be initiated only from consumer applications 104, but such payment may terminate at the consumer application, for example, if the recipient is a customer of the same financial institution as the sender, or at a provider application, for example, if the recipient is not a customer of the same financial institution as the sender.

An aspect of embodiments of the invention may involve a determination of an appropriate path for each transfer of funds. For example, there may be more than one possible path from a customer who is initiating a transfer to a recipient designated by the customer. Further, a particular path may typically pass through multiple nodes, each of which may be one of the different third party payment networks 102 located in geographically disparate locations and/or in different countries. In embodiments of the invention, it is not necessary for consumer applications 104 to know the payment path from the source to the destination. Thus, in such embodiments, the complexity in determining an optimal path through integrated third party payment platforms 102 may be hidden from the consumer applications 104.

Figure 2:
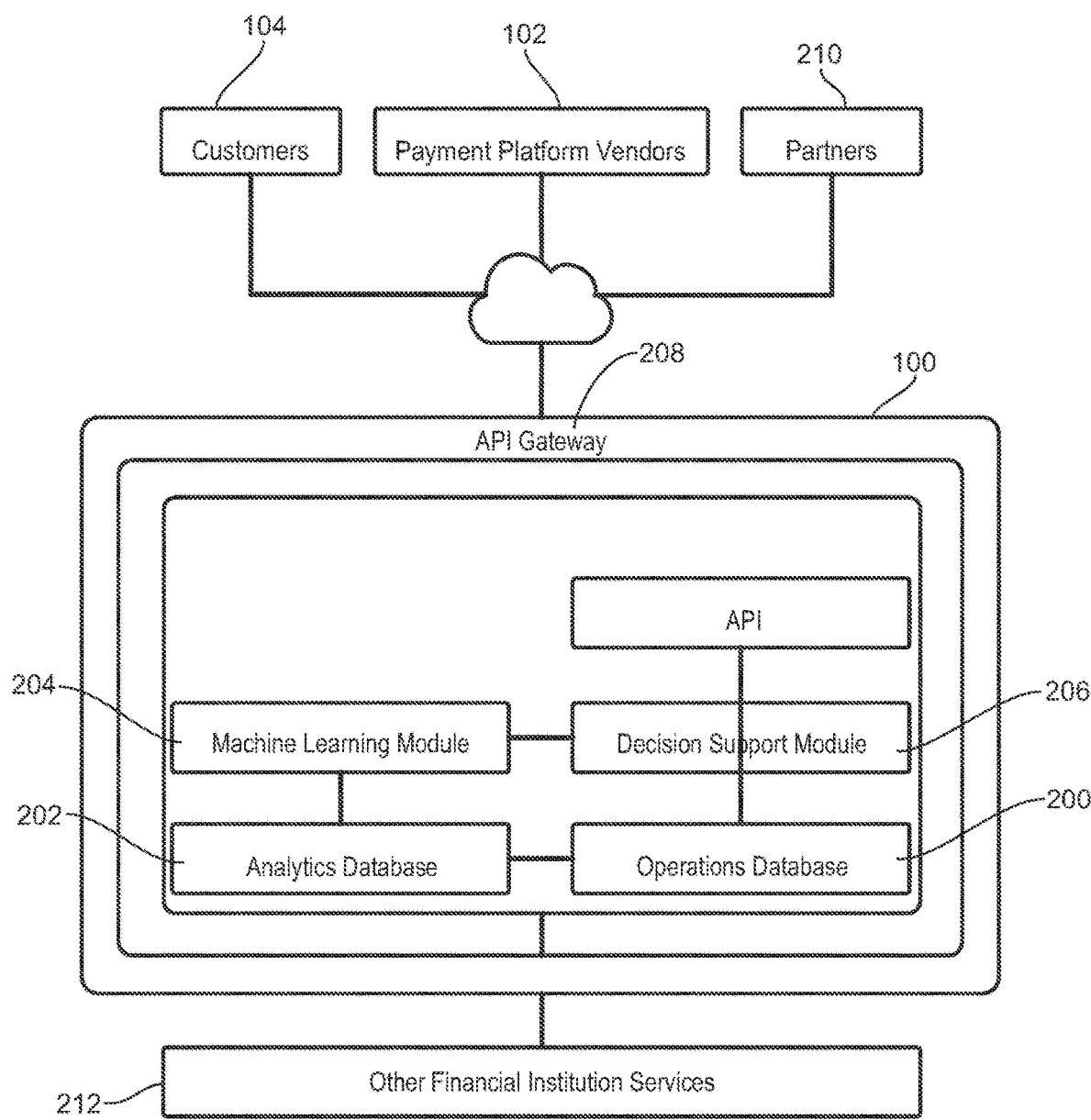
FIG. 2 is a schematic diagram that illustrates examples of further details of components for embodiments of the invention.

FIG. 2 is a schematic diagram that illustrates examples of further details of components for embodiments of the invention. Referring to FIG. 2, funds transfer server 100 for embodiments of the invention may include, for example, components or modules, such as an operations database 200, an analytics database 202, a machine learning function 204, and a decision support function 206. The operations database 200 may store, for example, metadata about payment networks/platforms 102, business rules, and payment-related constraints, as well as operational data about payments and instrumentation data. The analytics database 202 may store, for example, data derived from the operations database 200 on which the machine learning function 204 may execute algorithms, the results of which may be published to the analytics database.

Referring further to FIG. 2, the machine learning function 204 for embodiments of the invention may, for example, acquire and analyze data using various machine learning techniques for decision support and may also identify performance issues and trigger appropriate notifications. Thus, the machine learning function 204 may search for ways to optimize transfers. In addition, the decision support function 206 may include a rules engine, which may execute business rules and apply constraints and may also employ the machine learning function 204 to determine an optimal payment path for each payment transfer request.

Referring again to FIG. 2, embodiments of the may also include an API gateway 208, which may identify users based on a variety of criteria, such as telephone numbers and social network handles. The API layer 208 may enable access from customer-facing applications 104, partners 210, and possible feedback, for example, from payment platform vendors 102 about occurrences and/or changes in platform services. For example, such API layer 208 may enable the system for embodiments of the invention to communicate with other financial institution systems servers 212 to effect money transfers to the various accounts.

It is to be understood that embodiments of the invention may transfer funds from any and all types of customer accounts including, without limitation, demand deposit accounts, savings accounts, credit card accounts, and any other type of customer account. In other words, the system for embodiments of the invention may be characterized as a source account-agnostic, as well network-agnostic, money movement system.

Figure 3:
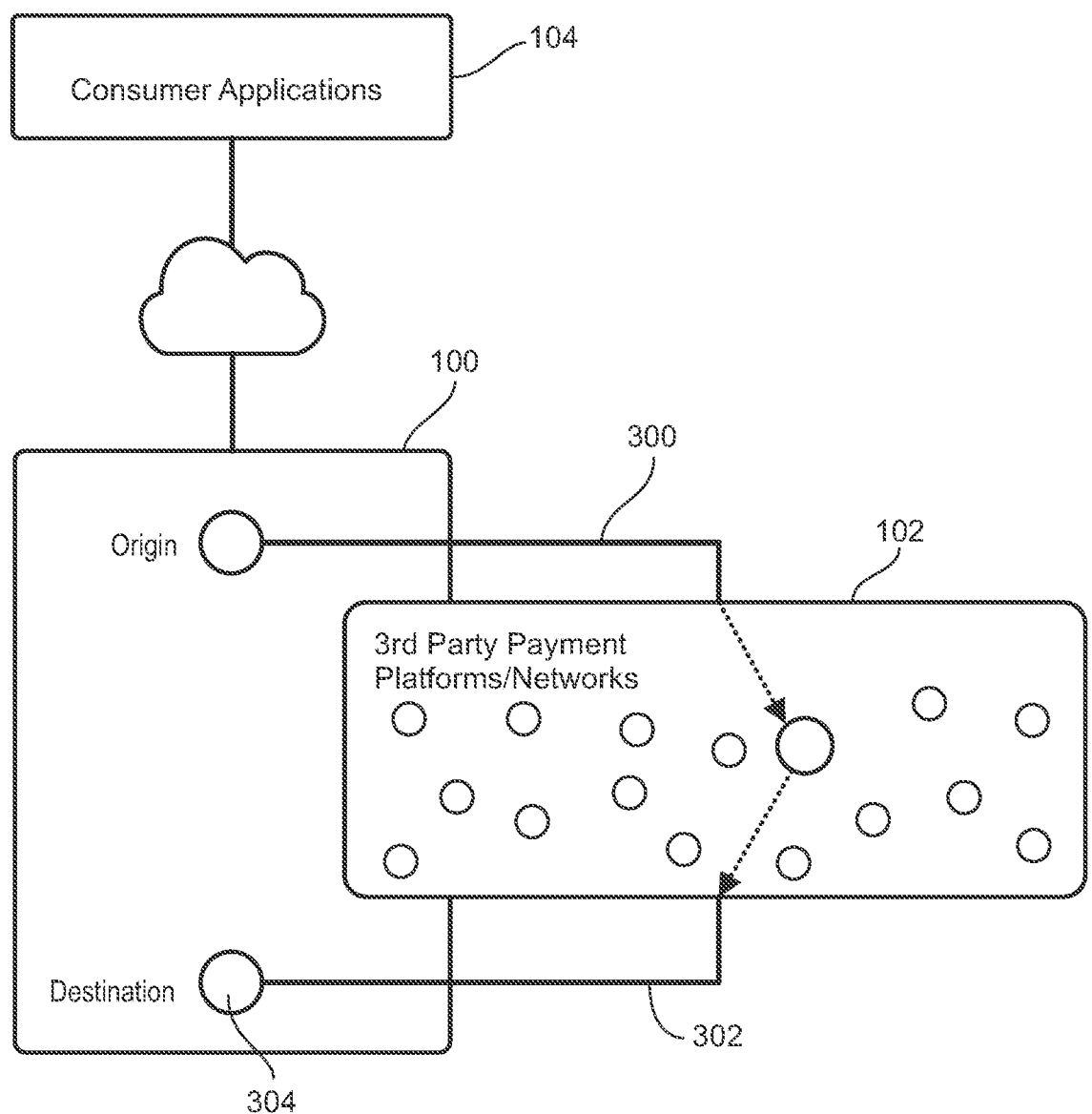
FIG. 3 is a schematic flow diagram that illustrates an example of moving money by the system for embodiments of the invention from a financial account in the United States to a recipient's account in a different financial institution located outside the United States.

FIG. 3 is a schematic flow diagram that illustrates an example of moving money by the system for embodiments of the invention from a financial account in the United States to a recipient's account in a different financial institution located outside the United States where the financial institution also has a presence, such as Singapore. Referring to FIG. 3, a number of different transfers may occur in such movement. For example, money may be transferred from a financial institution customer to his or her account in the financial institution in the United States and from the financial institution in the United States to the same financial institution, for example, in Singapore. Thereafter, at, 300, the money may then be transferred from the financial institution in Singapore to the financial institution's proxy account in one of the plurality of third party platforms 102. At, 302, the money may then be transferred from the financial institution's proxy account in one of the third party platforms 102 to the account 304 of the designated recipient in a different financial institution in Singapore.

An aspect of embodiments of the invention may be optimization of the timing and sequence of such transfers. For example, referring further to the example of FIG. 3, for a financial institution customer having a pre-designated preferred customer status, the transfer at 302 from the financial institution's proxy account in one of the third party platforms 102 to the designated recipient may be performed immediately after the transfer from the financial institution customer to his or her account in the financial institution in the United States, even though the transfer from the financial institution in the United States to the same financial institution in Singapore and the transfer at 300 from the financial institution in Singapore to the financial institution's proxy account in one of the third party platforms 102 has not been initiated.

Figure 4:
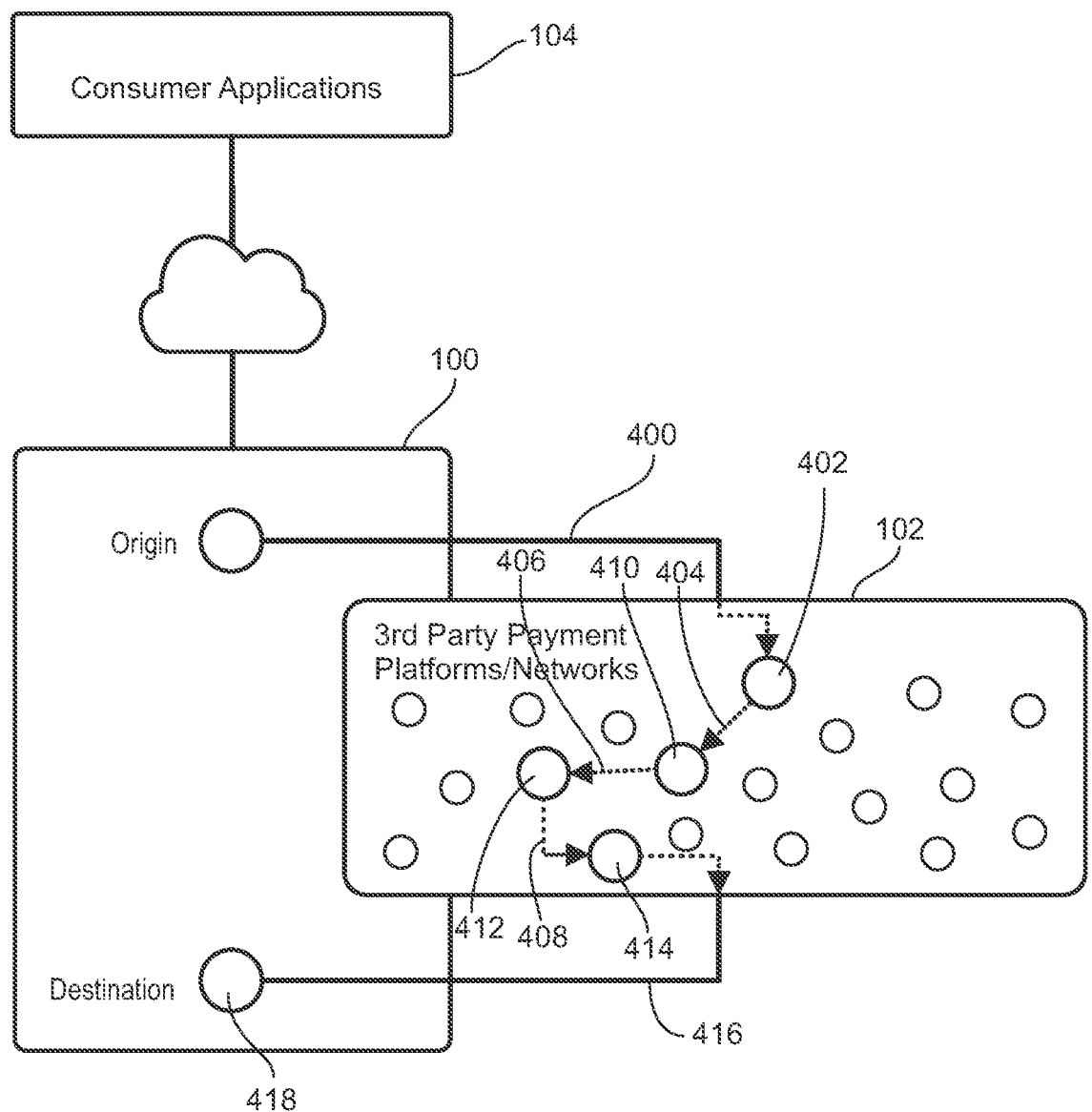
FIG. 4 is a schematic flow diagram that illustrates an example of a more complex movement of money by the system for embodiments of the invention from a financial institution customer's account to a recipient's account in a different financial institution.

FIG. 4 is a schematic flow diagram that illustrates an example of a more complex movement of money by the system for embodiments of the invention from a financial institution customer's account to a recipient's account in a different financial institution. Referring to FIG. 4, for example, money may be transferred, for example, from a financial institution customer to his or her account in the financial institution, for example, in New York. Thereafter, at 400, the money may be transferred from the financial institution in New York to a first financial institution-controlled third party platform proxy account node 402. The money may then be transferred from the first proxy account node 402 of the financial institution via a succession transfers at 404, 406, and 408, respectively, to second 410, third 412, and fourth 414 financial institution-controlled third party platform proxy account nodes. Finally, at 416, the money may be transferred from the financial institution's fourth proxy account node 414 to the designated recipient's account node 418 in the different financial institution.

Referring further to FIG. 4, assume, for example, that Bill in New York, who has an account with a financial institution, wishes to send $25 to Maya in Singapore, who has an account with a different financial institution. Responsive to receiving the request, the system for embodiments of the invention may look up the recipient, Maya. If the system finds the recipient, Maya, registered with any of the third party platforms 102 with which the system maintains an interface, the system may effect the requested transfer. Thus, the system may withdraw the requested $25 from Bill's account with the financial institution in New York.

Having withdrawn the funds, the system for embodiments of the invention may then determine a path for moving the money from Bill's account all the way to Maya's account via all the intervening nodes. For example, the system may determine an optimal path from the financial institution in New York to the same financial institution in Singapore or possibly another financial institution in Singapore, depending on which is more advantageous. When the optimal path is determined, the system for embodiments of the invention may make successive transfers into and out of each of the financial institution-controlled proxy account nodes that were identified in the optimal path.

In the example of FIG. 4, assume that the optimal path passes through the four financial institution-controlled proxy account, 402, 410, 412 and 414, in that particular sequence. Thus, the system for embodiments of the invention may debit the funds from Bill's account with the financial institution in New York and transfer the funds to the financial institution's account node 402. Thereafter, the funds may be transferred from node 402 to the financial institution's account node 410, from node 410 to the financial institution's account node 412, from node 412 to the financial institution's account node 414, and from node 414 to the recipient's account at the same or a different financial institution in Singapore.

The optimization of timing and sequence of such transfers for embodiments of the invention may involve, for example, selecting a particular channel for a money transfer and transferring the money along various paths within the selected channel, which may be optimized from the perspective of either or both the financial institution and the customer. Such optimization may be based on one or more of various criteria, such as a pre-designated customer status, a total cost of transfer, a speed of transfer, a degree of trust in the particular payment networks employed, potential sanctions, regulatory constraints, partner agreements, the country risk for each of the nodes in the payment path, and predetermined business rules.

Figure 5:
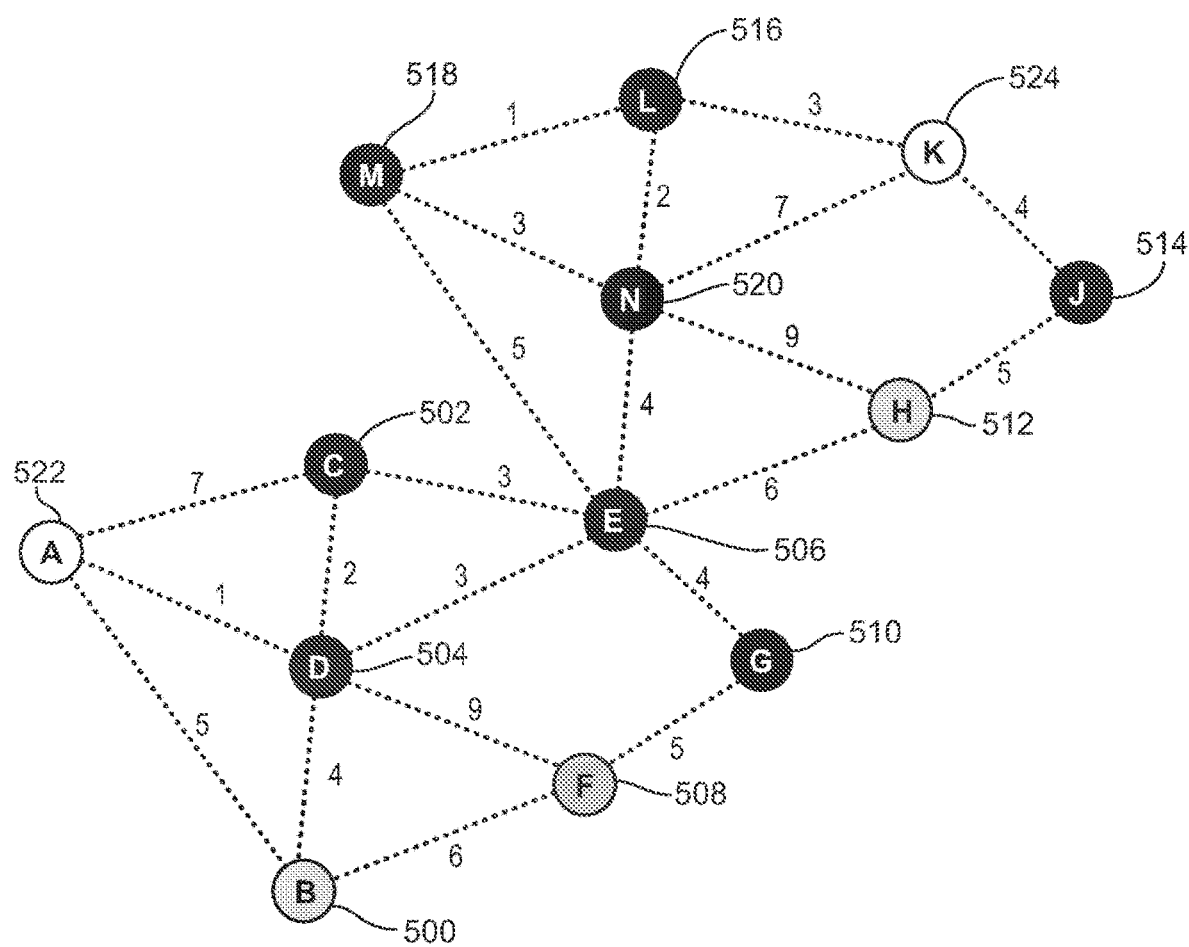
FIG. 5 is a schematic diagram that illustrates an example of a topology of third party network proxy account nodes and endpoint nodes for embodiments of the invention.

FIG. 5 is a schematic diagram that illustrates an example of a topology of financial institution-controlled third party platform or network proxy account nodes and endpoint nodes for embodiments of the invention. Referring to FIG. 5, systems for embodiments of the invention may integrate, for example, the plurality of financial institution-controlled third party platform or network proxy account nodes 500, 502, 504, 506, 508, 510, 512, 514, 516, 518, and 520. Examples of such third party platforms or networks may include, but are not limited to, PAYPAL®, VENMO®, CLEAR EXCHANGER, CAS®, and ALIPAY®. It is to be understood that systems for embodiments of the invention may integrate any number of third party platforms or networks that may include some or all of the above-identified third party platforms networks, as well as other third party platforms or networks.

Referring further to FIG. 5, the financial institution-controlled proxy account nodes may be communicably coupled directly or indirectly to one another between a source account endpoint node 522 and a destination account endpoint node 524. Direct connections between the nodes may be designated in FIG. 5 by broken lines, each broken line having an associated numeral representing an example of a relative cost of using the particular connection. For example, the numeral "1" associated with the broken lines between nodes 504 and 522 and between nodes 516 and 518 may indicate that the direct connection between those respective nodes is the least costly, and the numeral "9" associated with the broken line between nodes 512 and 520 may indicate that the direct connection between those particular nodes is the most costly.

Figure 6A:
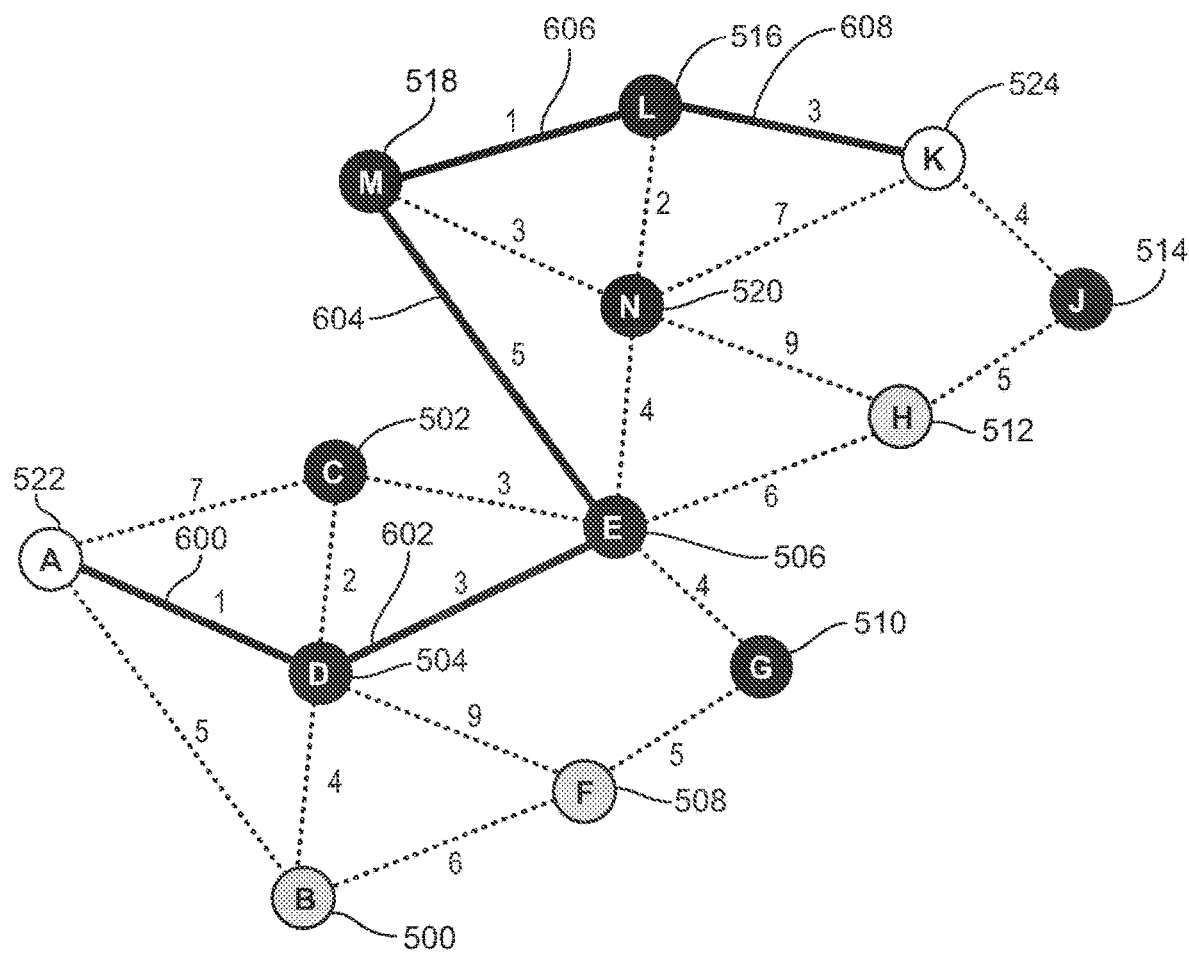
FIG. 6A-6C are schematic diagrams that illustrate examples of flows of information between third-party network proxy account nodes and endpoint nodes shown in FIG. 5 based respectively on cost, speed, or regulatory constraints for embodiments of the invention.
Figure 6B:
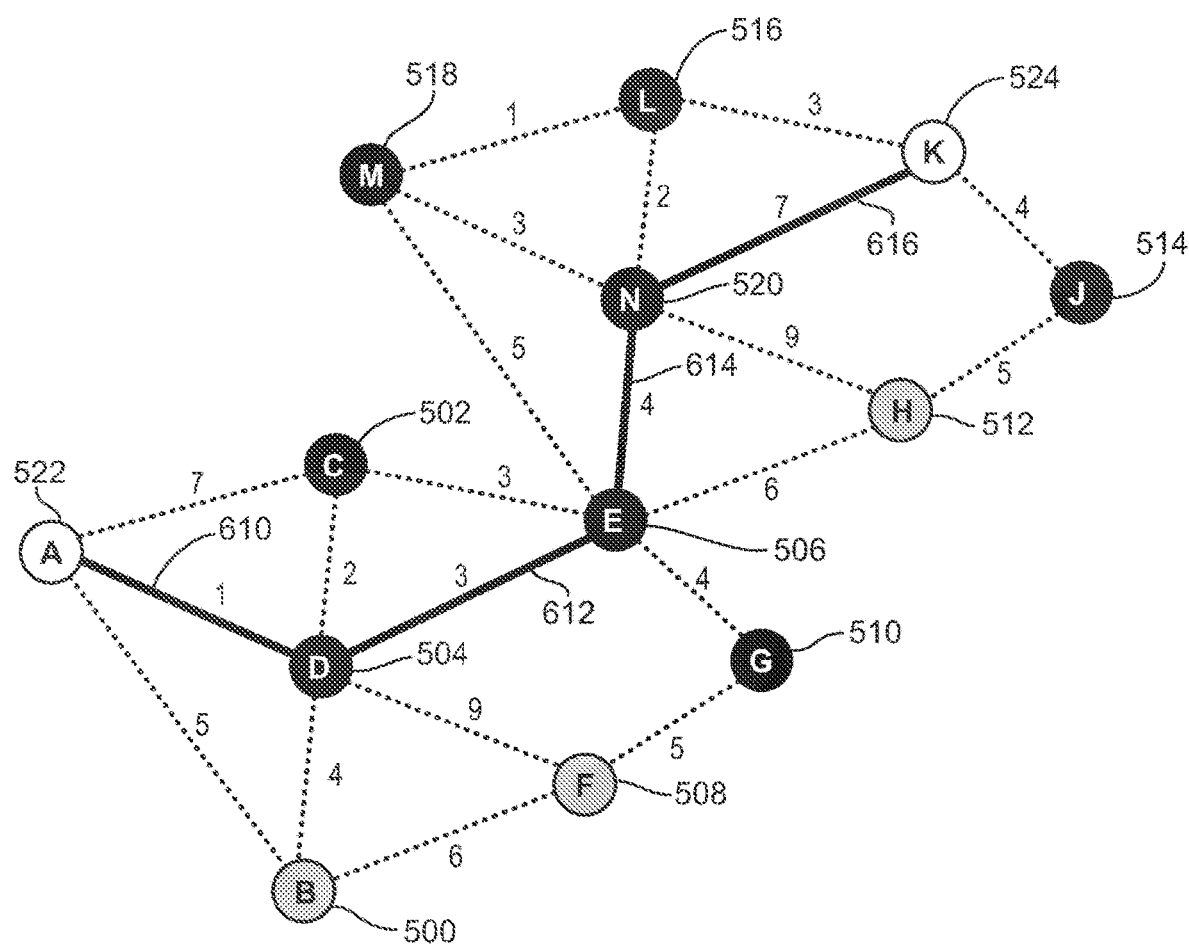
Figure 6C:
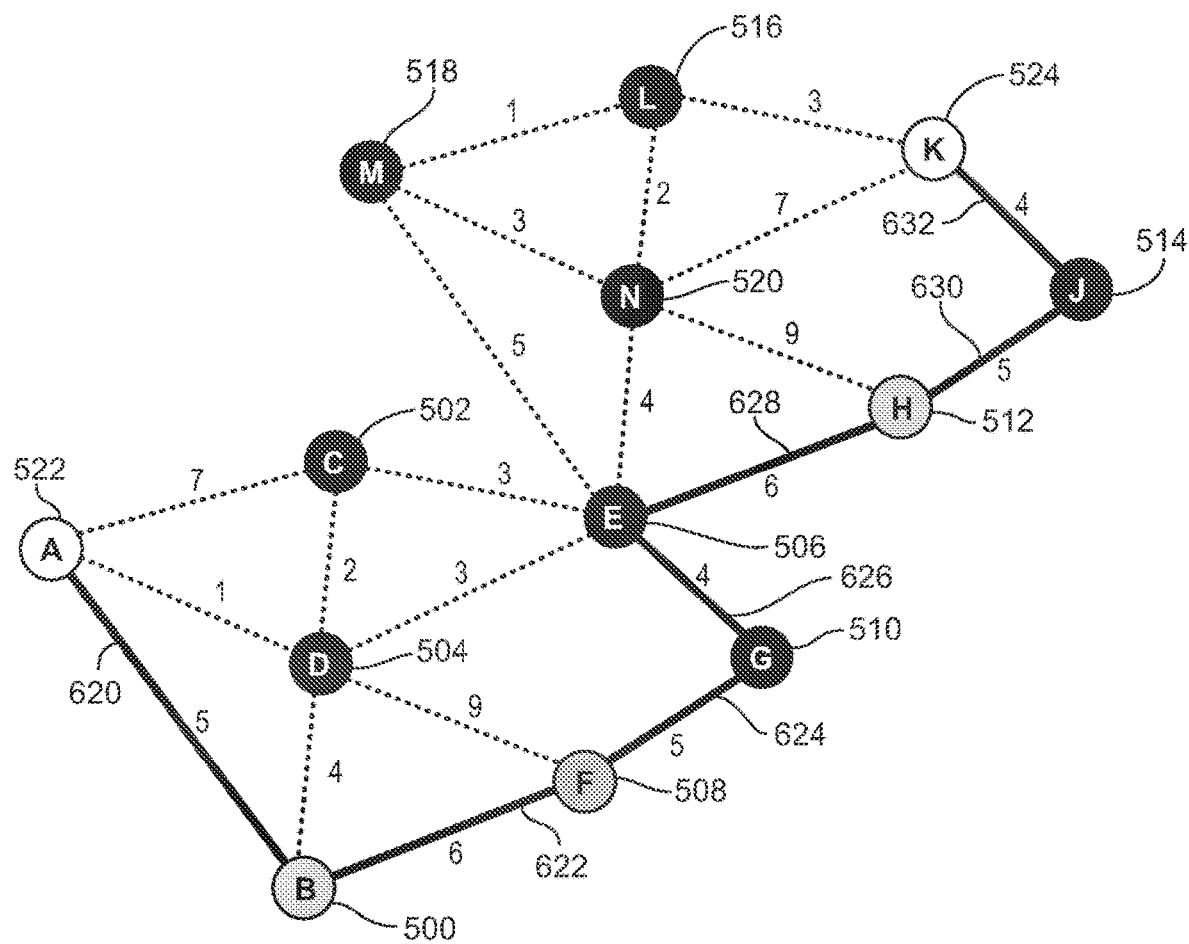

FIG. 6A-6C are schematic diagrams that illustrate examples of flows of information between financial institution-controlled third party platform or network proxy account nodes and endpoint nodes shown in FIG. 5 based respectively on cost, speed, or regulatory constraints for embodiments of the invention. In embodiments of the invention, the cost of each transfer, such as the cost by each third party network for each transaction, which may change at any time, may be continually monitored. Such cost information may be stored in the analytics database for embodiments of the invention and may be used by the analytics function, for example, to continually determine the lowest cost path is from a sender to a recipient.

Referring to FIG. 6A, the solid line segments 600, 602, 604, 606, and 608 extending respectively between source account endpoint node 522 and proxy account node 504, between proxy account node 504 and financial institution-controlled proxy account node 506, between proxy account node 506 and financial institution-controlled proxy account node 518, between proxy account node 518 and financial institution-controlled proxy account node 516, and between proxy account 516 and endpoint destination account 524 may represent a least costly route from source account endpoint node 522 to destination account endpoint node 524 without regard to minimizing the number of steps. That is, based on the cost of each transfer, such as the relative cost of each third party network node, in the path represented by the solid line segments in FIG. 6A, the particular path may be the least costly route between source account endpoint node 522 and destination account endpoint node 524 without regard to the total number of steps required.

Determinations of whether to select the least costly path or the shortest path may be made, for example, by systems for embodiments of the invention based on a predefined status of a sender. For example, for a customer of a predetermined status for whom speed may take precedence over cost, the transfer may be made accordingly via the fastest path, regardless of cost. Referring to FIG. 6B, the solid line segments 610, 612, 614, and 616 extending respectively between source account endpoint node 522 and financial institution-controlled proxy account node 504, between proxy account node 504 and financial institution-controlled proxy account node 506, between proxy account node 506 and financial institution-controlled proxy account node 520, and between proxy account node 520 and endpoint destination account 524 may represent a route that minimizes the number of steps which may consequently be the fastest path from source account endpoint node 522 to destination account endpoint node 524 without regard to cost.

On the other hand, as noted, for a customer of a predetermined status for whom cost may take precedence, the transfer may be made accordingly via the least expensive path, regardless of speed. Such determinations may be made by the system for embodiments of the invention based, for example, on predefined business rules. It is to be understood that there may also be hierarchy among the predefined business rules in which some criteria, such as country risk or regulatory requirements, may take precedence over other criteria, such as cost or speed. For example, business rules may specify that no matter how attractive a particular path may be in terms of cost or speed, if a country risk is deemed unacceptable according to business rules, the particular path may not be selected.

Likewise, a particular path that is attractive under criteria such as speed or cost may not be selected if there is a possibility of non-compliance with one or more regulatory requirements according to business rules. Referring to FIG. 6C, the solid line segments 620, 622, 624, 626, 628, 630, and 632 extending respectively between source account endpoint node 522 and financial institution-controlled proxy account node 500, between proxy account node 500 and financial institution-controlled proxy account node 508, between proxy account node 508 and financial institution-controlled proxy account node 510, between proxy account node 510 and financial institution-controlled proxy account node 506, between proxy account node 506 and financial institution-controlled proxy account node 512, between proxy account node 512 and financial institution-controlled proxy account node 514, and between proxy account node 514 and endpoint destination account 524 may represent a route that satisfies all regulatory requirements from source account endpoint node 522 to destination account endpoint node 524 without regard to cost or speed.

It is also to be understood that, according to embodiments of the invention, the above-noted predetermined criteria for determination of an optimized path are not exclusive and that such determination may be made according to any other suitable criterion or criteria that may be identified from time-to-time as transaction data is analyzed. It is to be further understood that the determination of optimized path may be made by the system for embodiments of the invention at run time without human interaction or intervention.

Figure 7:
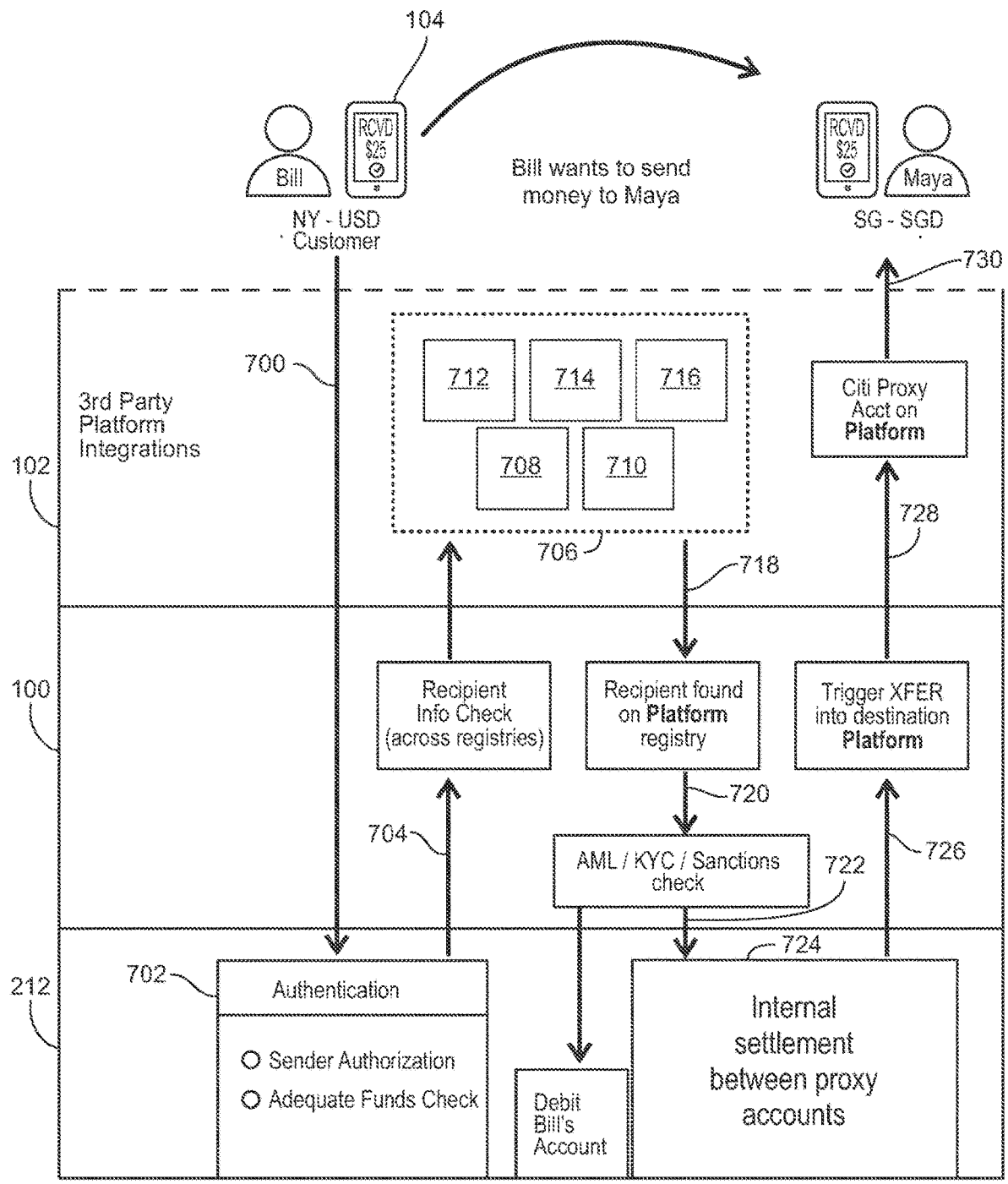
FIG. 7 shows an example of a use case for embodiments of the invention.

FIG. 7 shows an example of a use case for embodiments of the invention. Referring to FIG. 7, components for embodiments of the invention may include, for example, the funds transfer server functions 100, the third party platform or network proxy accounts 102, and the other financial institution systems servers 212. Assume, for example, that a financial institution customer (Bill) wishes to transfer $25 to a recipient (Maya) with an account at a different financial institution in Singapore. Referring further to FIG. 7, the customer may select the recipient from a contact list displayed on the customer's device 104 or enter, for example, a recipient email address, phone number, and transaction amount on the device 104. At 700, the entered information may be received and sent via the funds transfer server function 100 to an authentication function 702 of other financial institution systems servers 212.

Referring further to FIG. 7, after authentication of the customer and verification of an associated funding account, for example, by the financial institution authentication function 702 using current verification methods or a trusted identifier, at 704, a request for location of the recipient in one of the plurality of financial institution-controlled third party payment networks 706, such as networks 708, 710, 712, 714, and 716, may be returned to the funds transfer server function 100. Responsive to receiving the request, the funds transfer server function 100 may check a local cache for intended recipient details.

It is to be understood that the intended recipient's information is never sent out of the financial institution's data center except to the destination node. In addition, it is to be understood the intended recipient need not have accounts on any of the third party payment networks 706, since the financial institution's own proxy accounts on the third party payment networks are used in embodiments of the invention. It is to be further understood that a destination node is the only node on which the intended recipient needs to have an account.

Referring again to FIG. 7, at 718, upon locating the recipient on a participating network, details for the recipient may be passed back to the funds transfer server function 100. The recipient metadata may be stored in a local cache, for example, for later use in succeeding transactions, so it is not necessary to repeat the process for a succeeding transaction. However, if the recipient is not found on any participating network, the recipient may receive a message, for example, via SMS or email and routed to an on-boarding flow, such as a dedicated landing site having prompts to verify membership at a third party payment platform and an optimized flow for the recipient to register directly with the system for embodiments of the invention.

Referring further to FIG. 7, at 720, upon receipt of the recipient data, the recipient data may be passed to one or more compliance processes, such as anti-money-laundering (AML) and know-your-customer (KYC) sanctions list, and cleared at 722. Thus, once it is determined that the recipient has been found on one of the third party payment platforms 102, it is trusted that the particular third party payment platform has performed all of the KYC AML sanctions and checks. In the AML and KYC aspect, it is to be understood that each of the third party payment platforms 102 may be either government sponsored or maintained by banking consortiums that may allow transactions to be processed using, for example, a phone number or an email ID between customers of different financial institutions. Therefore, there may be a level of trust by the financial institution that such banking consortiums or governments have performed all such required regulatory checks.

Because the transaction is known to be legitimate, the funds transfer server function 100 for embodiments of the invention may be triggered to pass the requested transaction through one of the plurality of third party platforms to the recipient after the financial institution member country global funds transfer mechanism moves the funds to the destination member country global funds transfer mechanism account. Thus, when the transaction is cleared, at 724, an internal settlement between proxy accounts may occur. Such internal settlement may commence, for example, with a debit of an account of the financial institution in New York and a credit to a financial institution account in Singapore. The debit and credit may occur using, for example, a global funds transfer function of other financial institution systems servers 212 to move the money from a initiating financial institution global funds transfer mechanism account to a destination global funds transfer mechanism account.

Upon crediting the Singapore account of the financial institution, at 726, the transfer may be triggered from the Singapore financial institution account to a financial institution-controlled proxy account on the particular third party platform selected by the system for the transfer. At 728, the financial institution-controlled proxy account may be used to move the money from the financial institution-controlled proxy account into the recipient platform account. Once the funds have passed through each financial institution-controlled third party platform proxy account within the path selected for the transfer, at 730, the funds may be transferred to the recipient's account with the other financial institution in Singapore.

Figure 8:
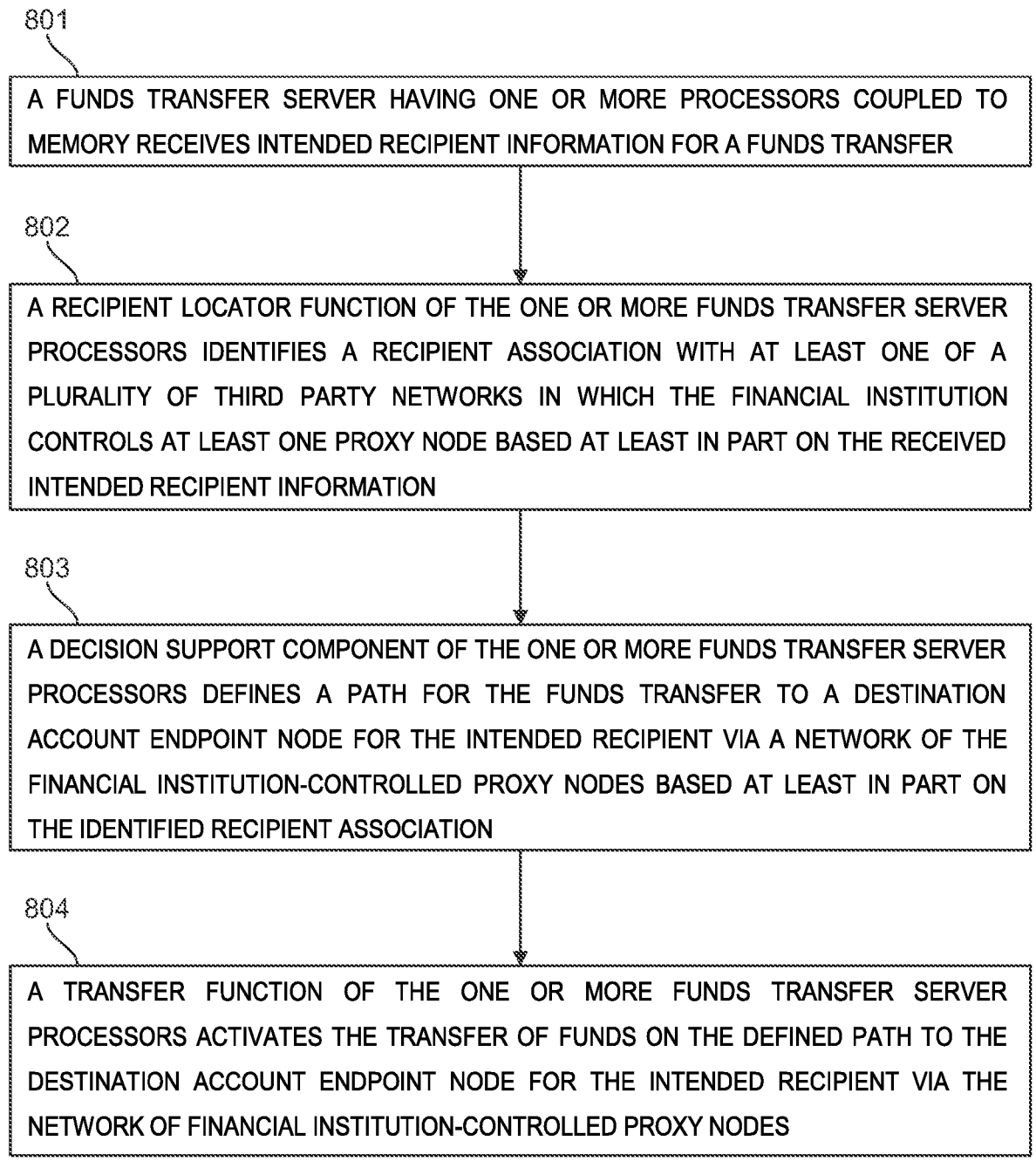
FIG. 8 shows an example overview of a funds transfer process for embodiments of the invention.

FIG. 8 shows an example overview of a funds transfer process for embodiments of the invention. Referring to FIG. 8, at 801, a funds transfer server 100 having one or more processors coupled to memory may receive intended recipient information for a funds transfer, and at 802, a recipient locator function of the funds transfer server 100 may identify a recipient association with at least one of a plurality of third party networks in which the financial institution controls at least one proxy node based at least in part on the received intended recipient information.

Referring further to FIG. 8, thereafter, at 803, a decision support component 206 of the one or more funds transfer server processors may define a path for the funds transfer to a destination account endpoint node 522 for the intended recipient via a network of the financial institution-controlled proxy nodes based at least in part on the identified recipient association. At 804, a transfer function of the funds transfer server 100 may activate the transfer of funds on the defined path to the destination account endpoint node 522 for the intended recipient via the network of financial institution-controlled proxy nodes.

It is to be understood that embodiments of the invention may be implemented as processes of a computer program product, each process of which is operable on one or more processors either alone on a single physical platform, such as a personal computer, or across a plurality of platforms, such as a system or network, including networks such as the Internet, an intranet, a WAN, a LAN, a cellular network, or any other suitable network. Embodiments of the invention may employ client devices that may each comprise a computer-readable medium, including but not limited to, random access memory (RAM) coupled to a processor. The processor may execute computer-executable program instructions stored in memory. Such processors may include, but are not limited to, a microprocessor, an application specific integrated circuit (ASIC), and or state machines. Such processors may comprise, or may be in communication with, media, such as computer-readable media, which stores instructions that, when executed by the processor, cause the processor to perform one or more of the steps described herein.

It is also to be understood that such computer-readable media may include, but are not limited to, electronic, optical, magnetic, RFID, or other storage or transmission device capable of providing a processor with computer-readable instructions. Other examples of suitable media include, but are not limited to, CD-ROM, DVD, magnetic disk, memory chip, ROM, RAM, ASIC, a configured processor, optical media, magnetic media, or any other suitable medium from which a computer processor can read instructions. Embodiments of the invention may employ other forms of such computer-readable media to transmit or carry instructions to a computer, including a router, private or public network, or other transmission device or channel, both wired or wireless. Such instructions may comprise code from any suitable computer programming language including, without limitation, C, C++, C#, Visual Basic, Java, Python, Perl, and JavaScript.

It is to be further understood that client devices that may be employed by embodiments of the invention may also comprise a number of external or internal devices, such as a mouse, a CD-ROM, DVD, keyboard, display, or other input or output devices. In general such client devices may be any suitable type of processor-based platform that is connected to a network and that interacts with one or more application programs and may operate on any suitable operating system. Server devices may also be coupled to the network and, similarly to client devices, such server devices may comprise a processor coupled to a computer-readable medium, such as a random access memory (RAM). Such server devices, which may be a single computer system, may also be implemented as a network of computer processors. Examples of such server devices are servers, mainframe computers, networked computers, a processor-based device, and similar types of systems and devices.

What is claimed is:

1. A system for determining alternative routes for transferring virtual resources between nodes across networks, the system comprising:
    a storage device; and
    one or more processors communicatively coupled to the storage device storing instructions thereon, the instructions causing the one or more processors to:
        receive destination information relating to a destination node for transfer of a plurality of virtual resources from a source node to the destination node, wherein the source node and the destination node belong to a first network comprising a first plurality of nodes;
        determine, based on the destination information, an association between the destination node and a second network comprising a second plurality of nodes, wherein the second plurality of nodes comprises a set of proxy nodes associated with the first network;
        input, into a machine learning model, a source identifier of the source node, a destination identifier of the destination node, and a set of identifiers of the set of proxy nodes to cause the machine learning model to output a route comprising one or more proxy nodes of the set of proxy nodes for transfer of the plurality of virtual resources from the source node to the destination node along the route, wherein the route is based at least in part on a first criterion among a set of predefined criteria comprising one or more of resource requirement, speed, or regulatory constraint;
        initiate the transfer of the plurality of virtual resources by transmitting a first command to credit the destination node and a second command to debit the source node before transmitting any commands for intermediate transfers along the route; and
        after transmitting the first command and the second command, transmit one or more commands to conduct intermediate transfers between the one or more proxy nodes of the set of proxy nodes along the route.

2. The system of claim 1, wherein the instructions further cause the one or more processors to:
    eliminate proxy nodes from the set of proxy nodes based on the set of predefined criteria; and based on the machine learning model failing to generate a route between the source node and the destination node along the proxy nodes that have not been eliminated:
  modify a criterion that has a lowest priority among the set of predefined criteria;
  generate a subset of proxy nodes by eliminating proxy nodes from the set of proxy nodes based on the set of predefined criteria after modifying the criterion having the lowest priority; and
  input, into the machine learning model, the subset of proxy nodes to cause the machine learning model to select the route between the source node and the destination node from among the subset of proxy nodes that have not been eliminated.

3. The system of claim 1, wherein the route is further based at least in part on source information relating to the source node, the source information comprising a user classification of a user associated with the source node, and wherein the instructions further cause the one or more processors to:
  based on the user classification being a first classification, modify one or more priorities of the set of predefined criteria to cause the machine learning model to prioritize the speed over the resource requirement for selecting the route; and
  based on the user classification being a second classification, modify the one or more priorities of the set of predefined criteria to cause the machine learning model to prioritize the resource requirement over the speed for selecting the route,
  wherein the first classification is a higher classification than the second classification.

4. The system of claim 1, wherein the route is further based at least in part on (i) source information relating to the source node and (ii) the destination information, and wherein the source information comprises source location information relating to the source node and the destination information comprises destination location information relating to the destination node.

5. The system of claim 4, wherein the instructions further cause the one or more processors to:
  based on the source location information and the destination location information both indicating locations associated with a first level of risk, generate a subset of proxy nodes by eliminating proxy nodes associated with locations associated with a second level of risk from the set of proxy nodes, wherein the second level of risk is higher than the first level of risk; and
  input, into the machine learning model, the subset of proxy nodes to cause the machine learning model to select the route between the source node and the destination node from among the subset of proxy nodes that have not been eliminated.

6. The system of claim 4, wherein the instructions further cause the one or more processors to:
  determine (i) a first regulatory constraint based on the source location information and (ii) a second regulatory constraint based on the destination location information; and
  modify one or more priorities of the set of predefined criteria to cause the machine learning model to prioritize the first regulatory constraint and the second regulatory constraint over the resource requirement and the speed for selecting the route.

7. A method comprising:
  receiving destination information relating to a destination node for transfer of a plurality of virtual resources from a source node to the destination node, wherein the source node and the destination node belong to a first plurality of nodes;
  determining, based on the destination information, an association between the destination node and a second plurality of nodes, wherein the second plurality of nodes comprises a set of proxy nodes associated with the first plurality of nodes;
  inputting, into a machine learning model, a source identifier of the source node, a destination identifier of the destination node, and a set of identifiers of the set of proxy nodes to cause the machine learning model to output a route comprising one or more proxy nodes of the set of proxy nodes for transfer of the plurality of virtual resources from the source node to the destination node along the route, wherein the route is based at least in part on a node feature of each proxy node of the set of proxy nodes;
  conducting the transfer of the plurality of virtual resources by crediting the destination node and debiting the source node before conducting any intermediate transfers on the route; and
  after crediting the destination node and debiting the source node, conducting one or more intermediate transfers between the one or more proxy nodes of the set of proxy nodes along the route.

8. The method of claim 7, wherein the node feature of each proxy node of the set of proxy nodes comprises at least a first criterion among a set of predefined criteria, the set of predefined criteria comprising one or more of resource requirement, speed, or regulatory constraint.

9. The method of claim 8, further comprising:
  eliminating proxy nodes from the set of proxy nodes based on at least the first criterion among the set of predefined criteria; and
  based on the machine learning model failing to generate a route between the source node and the destination node along the proxy nodes that have not been eliminated:
    modifying a criterion that has a lowest priority among the set of predefined criteria;
    generating a subset of proxy nodes by eliminating proxy nodes from the set of proxy nodes based on the set of predefined criteria after modifying the criterion having the lowest priority; and
    inputting, into the machine learning model, the subset of proxy nodes to cause the machine learning model to select the route between the source node and the destination node from among the subset of proxy nodes that have not been eliminated.

10. The method of claim 8, wherein the route is further based at least in part on source information relating to the source node, the source information comprising a user classification of a user associated with the source node, further comprising:
  based on the user classification being a first classification, modifying one or more priorities of the set of predefined criteria to cause the machine learning model to prioritize the speed over the resource requirement for selecting the route; and
  based on the user classification being a second classification, modifying the one or more priorities of the set of predefined criteria to cause the machine learning model to prioritize the resource requirement over the speed for selecting the route, wherein the first classification is a higher classification than the second classification.

11. The method of claim 7, wherein the route is further based at least in part on (i) source information relating to the source node and (ii) the destination information, and wherein the source information comprises source location information relating to the source node and the destination information comprises destination location information relating to the destination node.

12. The method of claim 11, further comprising:
based on the source location information and the destination location information both indicating locations associated with a first level of risk, generating a subset of proxy nodes by eliminating proxy nodes associated with locations associated with a second level of risk from the set of proxy nodes, wherein the second level of risk is higher than the first level of risk; and
inputting, into the machine learning model, the subset of proxy nodes to cause the machine learning model to select the route between the source node and the destination node from among the subset of proxy nodes that have not been eliminated.

13. The method of claim 11, further comprising:
determining (i) a first regulatory constraint based on the source location information and (ii) a second regulatory constraint based on the destination location information; and
modifying one or more priorities of node features of the set of proxy nodes to cause the machine learning model to prioritize the first regulatory constraint and the second regulatory constraint over other node features for selecting the route.

14. One or more non-transitory computer-readable media comprising instructions recorded thereon that, when executed by one or more processors, cause operations for monitoring application programming interfaces at a network system, comprising:
receiving destination information relating to a destination node for transfer of a plurality of virtual resources from a source node to the destination node, wherein the source node and the destination node belong to a first plurality of nodes;
determining, based on the destination information, an association between the destination node and a second plurality of nodes, wherein the second plurality of nodes comprises a set of proxy nodes associated with the first plurality of nodes;
inputting, into a machine learning model, a source identifier of the source node, a destination identifier of the destination node, and a set of identifiers of the set of proxy nodes to cause the machine learning model to output a route comprising one or more proxy nodes of the set of proxy nodes for transfer of the plurality of virtual resources from the source node to the destination node along the route, wherein the route is based at least in part on a node feature of each proxy node of the set of proxy nodes;
conducting the transfer of the plurality of virtual resources by crediting the destination node and debiting the source node before conducting any intermediate transfers on the route; and
after crediting the destination node and debiting the source node, conducting one or more intermediate transfers between the one or more proxy nodes of the set of proxy nodes along the route.

15. The one or more non-transitory computer-readable media of claim 14, wherein the node feature of each proxy node of the set of proxy nodes comprises at least a first criterion among a set of predefined criteria comprising one or more of resource requirement, speed, or regulatory constraint.

16. The one or more non-transitory computer-readable media of claim 15, wherein the instructions further cause the one or more processors to perform operations comprising:
eliminating proxy nodes from the set of proxy nodes based on at least the first criterion among the set of predefined criteria; and
based on the machine learning model failing to generate a route between the source node and the destination node along the proxy nodes that have not been eliminated:
modifying a criterion that has a lowest priority among the set of predefined criteria;
generating a subset of proxy nodes by eliminating proxy nodes from the set of proxy nodes based on the set of predefined criteria after modifying the criterion having the lowest priority; and
inputting, into the machine learning model, the subset of proxy nodes to cause the machine learning model to select the route between the source node and the destination node from among the subset of proxy nodes that have not been eliminated.

17. The one or more non-transitory computer-readable media of claim 15, wherein the route is further based at least in part on source information relating to the source node, the source information comprising a user classification of a user associated with the source node, wherein the instructions further cause the one or more processors to perform operations comprising:
based on the user classification being a first classification, modifying one or more priorities of the set of predefined criteria to cause the machine learning model to prioritize the speed over the resource requirement for selecting the route; and
based on the user classification being a second classification, modifying the one or more priorities of the set of predefined criteria to cause the machine learning model to prioritize the resource requirement over the speed for selecting the route,
wherein the first classification is a higher classification than the second classification.

18. The one or more non-transitory computer-readable media of claim 14, wherein the route is further based at least in part on (i) source information relating to the source node and (ii) the destination information, and wherein the source information comprises source location information relating to the source node and the destination information comprises destination location information relating to the destination node.

19. The one or more non-transitory computer-readable media of claim 18, wherein the instructions further cause the one or more processors to perform operations comprising:
based on the source location information and the destination location information both indicating locations associated with a first level of risk, generating a subset of proxy nodes by eliminating proxy nodes associated with locations associated with a second level of risk from the set of proxy nodes, wherein the second level of risk is higher than the first level of risk; and
inputting, into the machine learning model, the subset of proxy nodes to cause the machine learning model to select the route between the source node and the destination node from among the subset of proxy nodes that have not been eliminated.

20. The one or more non-transitory computer-readable media of claim 18, wherein the instructions further cause the one or more processors to perform operations comprising:
   determining (i) a first regulatory constraint based on the source location information and (ii) a second regulatory constraint based on the destination location information; and
   modifying one or more priorities of node penalties of the set of proxy nodes to cause the machine learning model to prioritize the first regulatory constraint and the second regulatory constraint over other node penalties for selecting the route.

* * * * *